United States Patent [19]

Kelley

[11] Patent Number: 4,538,522
[45] Date of Patent: Sep. 3, 1985

[54] CABLE GRIPPING APPARATUS HAVING FORWARD AND REARWARD MOVEMENT CAPABILITIES

[75] Inventor: Douglas P. Kelley, Redmond, Wash.

[73] Assignee: Electric Power Research Institute, Inc., Palo Alto, Calif.

[21] Appl. No.: 698,740

[22] Filed: Feb. 5, 1985

Related U.S. Application Data

[63] Continuation of Ser. No. 414,483, Sep. 2, 1982, abandoned.

[51] Int. Cl.³ .............................................. B61C 11/02
[52] U.S. Cl. ..................................... 104/287; 104/165; 104/202; 175/230; 254/134.6; 405/184
[58] Field of Search .................. 104/165, 173 R, 202, 104/287, 112; 254/105, 134.6, 106, 134.3 FT, 134.5; 175/53, 230; 405/184

[56] References Cited

U.S. PATENT DOCUMENTS

| 683,845 | 10/1901 | Callahan | 254/134.6 |
| 1,128,746 | 2/1915 | Bierce | 254/134.6 |
| 4,385,667 | 5/1983 | Reichman et al. | 254/134.6 X |
| 4,403,667 | 9/1983 | Reichman et al. | 254/134.6 X |

Primary Examiner—Randolph A. Reese
Attorney, Agent, or Firm—Flehr, Hohbach, Test, Albritton & Herbert

[57] ABSTRACT

An improved cable following apparatus especially suitable for use in replacing an existing underground cable is disclosed herein. This apparatus utilizes a telescopically configured main body disposed around a cable in question and front and rear cable gripping mechanisms which alternatively grip the cable so as to cause the telescopic body to slide along the latter in a forward direction. The cable following apparatus also includes a technique for releasing both of the gripping mechanisms from the cable at the same time in order to be able to pull the entire apparatus rearwardly in the event it becomes necessary or desirable to do so.

8 Claims, 3 Drawing Figures

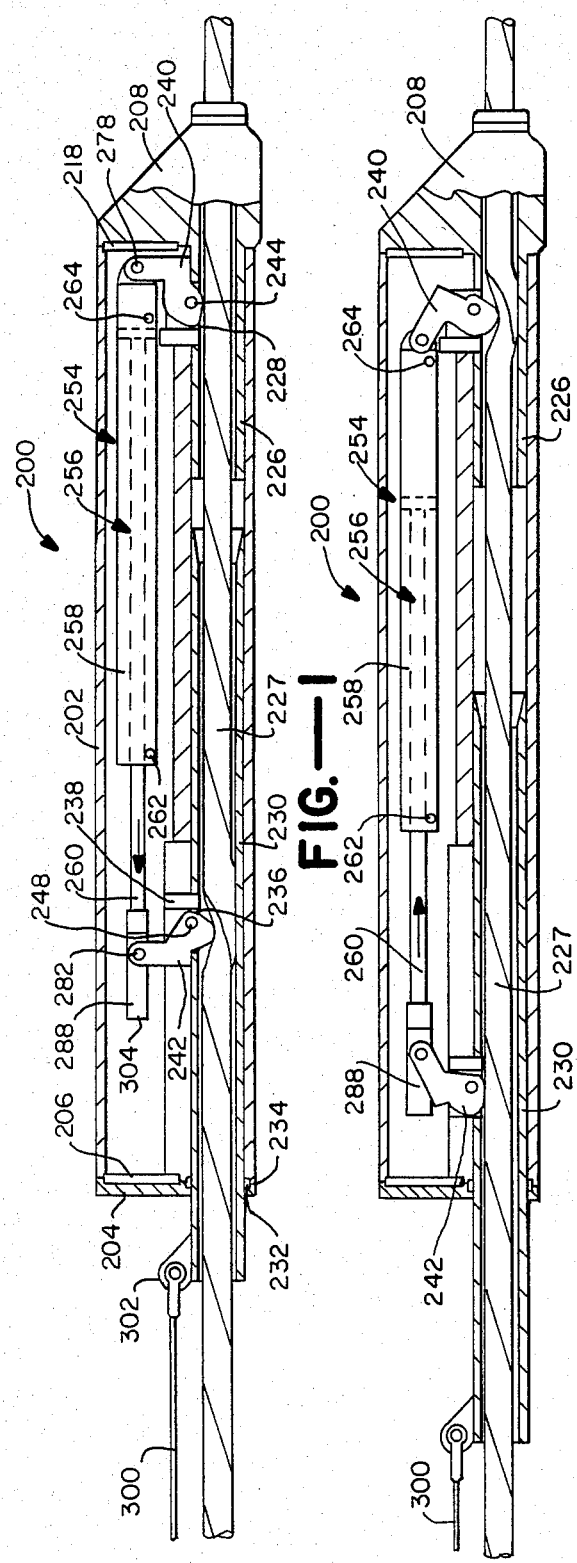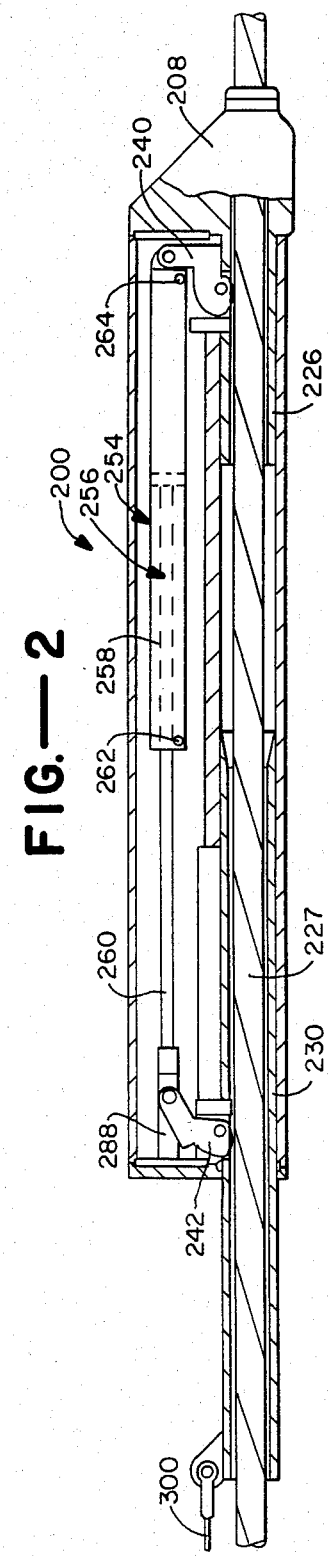

CABLE GRIPPING APPARATUS HAVING FORWARD AND REARWARD MOVEMENT CAPABILITIES

This is a continuation of application Ser. No. 414,483 filed Sept. 2, 1982 and now abandoned.

The present invention relates generally to a cable following apparatus especially suitable for use in replacing an existing underground cable as described in U.S. Pat. No. 4,385,667 (hereinafter referred to as Reichman I) and more particularly to an improvement in one of the cable following apparatus disclosed in U.S. Pat. No. 4,403,667 (hereinafter referred to as Reichman II).

The Reichman I patent application recited above and incorporated herein by reference specifically discloses a technique for replacing an existing underground cable and a specific apparatus for doing so. The apparatus includes a cable follower which is interconnected with the cable to be replaced for slidable movement along the latter. At the same time, means are provided for loosening the soil around the cable, preferably by means of one or more fluid jets. Once the soil is loosened, the cable can be easily pulled out of the ground and replaced with a new cable. A specific cable following arrangement is disclosed in the Reichman I application and two additional arrangements are disclosed in Reichman II which is also incorporated herein by reference. The most preferred one of these arrangements is described specifically in FIGS. 6-9 of Reichman II and includes a telescopically configured main body, a pair of cable gripping mechanisms and a hydraulically actuated piston-cylinder device. The housing is disposed around the particular cable to be replaced and the piston-cylinder unit is used to cause the two cable gripping mechanisms to alternately grip and release the cable in a way which causes the telescopic body to slide along the cable in a forward direction.

Each of the specific cable followers described in the Reichman I and II applications recited above is designed to move along its associated cable in a forward direction only. For example, in the preferred embodiment described immediately above, at any time during its cable following procedure, one of the gripping mechanisms remains in gripping engagement with its cable so that the overall cable following apparatus cannot be pulled rearwardly along the cable. However, it has been found that there are times when it is desirable or even necessary to bring the cable following apparatus back to its starting point, for example if it malfunctions during its forward movement along the cable or if an unpenetrable obstruction lies in its forward path of movement. At the same time, it is desirable to retain the general configuration of the preferred cable following apparatus disclosed in FIGS. 6-9 of Reichman II.

In view of the foregoing, it is one object of the present invention to provide an improved cable following apparatus of the general type described in the Reichman I and II patent applications recited above but one which is capable of being moved rearwardly along an associated cable.

Another object of the present invention is to provide a cable following apparatus which moves in a forward direction along its associated cable in the same way as the preferred cable following apparatus recited above but which may be moved rearwardly along the cable without requiring a complicated mechanism to accomplish this.

As will be seen hereinafter, the cable following apparatus disclosed herein includes a main body, means connected with the main body and utilizing first and second cable grippers for alternately gripping an associated cable in a way which causes the main body to move in a forward direction along the cable but which prevents the main body from moving in a rearward direction, so long as one of the grippers engages the cable. In addition and in accordance with the present invention, the cable following apparatus disclosed herein includes means for releasing both of the grippers from the cable so that its main body can be moved rearwardly along the cable, for example by means of a tow rope. In a preferred embodiment, a tow rope is not only used to pull the cable following apparatus in a rearward direction along its associated cable but also for initially causing both of the cable grippers to disengage from the cable at the same time.

The improved cable gripping apparatus disclosed herein will be described in more detail hereinafter in conjunction with the drawing wherein:

FIG. 1 is a partially broken away longitudinal sectional view of the cable following apparatus, illustrated in a first operating position;

FIG. 2 is a view similar to FIG. 1 but illustrating the cable following apparatus in a second operating position; and FIG. 3 is a view similar to FIGS. 1 and 2 but illustrating the cable following apparatus in still a third operating position.

Turning now to the drawing, wherein like components are designated by like reference numerals throughout the various figures, a cable following apparatus is illustrated and generally designated by the reference numeral 200. This apparatus is shown having a main body including an outermost support tube or body segment 202 which is closed at its back end by means of a rear flange 204 and associated pilot spacer 206. The front end of support tube 202 carries a front end cap arrangement generally indicated at 208 which may be identical to any of the corresponding front cap arrangements forming part of the cable following apparatus described in the Reichman I and II applications. The specific embodiment illustrated, that is arrangement 208, is unlike those in the Reichman I and II applications but does not form part of the present invention and hence is only shown generally.

Continuing with the description of apparatus 200, a front cable guiding tube (body segment) 226 which forms part of the apparatus body is disposed within support tube 202 and has its forwardmost end connected with front end cap arrangement 208, integrally so in the embodiment shown. Both tubes 202 and 226 are disposed around a given cable 227. For the reasons to be discussed below, the cable guiding tube 226 is disposed at the bottom end of tube 202 and includes an opening 228 in its top side wall slightly inward of arrangement 208.

A second cable guide tube (body segment) 230 also forming part of the apparatus body is also disposed within outermost support tube 202 in axial alignment with and directly rearwardly of tube 226, but also around cable 227. However, tube 230 is supported within tube 202 for axial slidable movement into and out of tube 202 through the back end of the latter, that is, towards and away from the back end of tube 226. In order to provide this movement of tube 230 relative to tubes 202 and 226, rear flange 204 is provided with an appropriately sized opening 232 and a guide bushing 234 as provided around the opening in slidable engagement with the outer surface of tube 230. Otherwise, tube 230 slides on the inner bottom side of tube 202. For reasons to be discussed below, the slidable tube 230 includes an opening 236 in its top side wall at an intermediate point along its length, and a flange 238 is connected with and extends up from the side wall just in front of this opening.

In addition to the various components thus far described, cable follower 200 includes a first forwardmost cable gripping device 240 and a second or rearwardmost cable gripping device 242. The cable gripping device 240 is somewhat L-shaped in configuration as shown in the drawing and is mounted within outermost tube 202 for pivotal movement about an axis 244 between the cable engaging position shown in FIG. 2 through opening 228 and a position out of engagement with the cable 227 as shown in FIGS. 1 and 3. A pivot pin or any other suitable means may be utilized for supporting the cable gripping device 240 in this manner so long as the latter is slidably movable with outermost tube 202 and guide tube 226 in the manner to be described. The rearwardmost cable gripping device 242 is similarly shaped and connected with sliding tube 230 while, at the same time, being pivotally mounted for movement between a position out of engagement with the cable 227 as illustrated in FIGS. 2 and 3 and a cable engaging position about axis 248 and into opening 236, as illustrated in FIG. 1.

Overall cable following apparatus 200 also includes an arrangement generally indicated at 254 for causing the outermost tube or body segment 202 and its associated cable guiding tube or body segment 226 to slide forward along and relative to the cable in incremental steps in an alternating manner with tube or body segment 230. To this end, arrangement 254 includes a hydraulic cylinder arrangement 256 disposed within outer tube 202. The hydraulic cylinder arrangement includes an outer cylinder 258 and a piston 260 telescopically movable between an extended position and a retracted position within the back end of the cylinder. Two ports, a rear port 262 and a front port 264 are provided in cylinder 258. The rear port is adapted to receive fluid under pressure from an appropriate source and the front port is adapted to receive fluid under pressure in the same manner, as described in more detail in the Reichman II patent application recited above. For reasons to be discussed below, when hydraulic fluid is applied into cylinder 258 through its rearward port 262, the piston 260 is caused to move forward relative to the cylinder and, at the same time, the cylinder is forced rearwardly relative to the piston. This presupposes that the port 264 remains open to the ambient pressure (or relieved of pressure generally) as fluid is directed into port 262. This procedure is reversed by opening the port 262 to ambient pressure and, at the same time, applying hydraulic fluid into the cylinder through port 264. This causes the cylinder to move forward while the piston is pushed in a rearward direction. The way in which this alternating movement of the piston and cylinder causes the overall apparatus to slide forward along the cable in incremental steps will be discussed below. However, in order to make this happen, the front end of the cylinder is pivotally connected to cable gripping device 240 by a suitable pivot means 278 such that movement of the cylinder between a rearward position and a forward position relative to previously recited axis 244 causes the entire gripping device 240 to move between its locked position shown in FIG. 2 and its unlocked position shown in FIG. 1. In a similar manner, the piston 260 is pivotally connected near its rearwardmost end to cable gripping device 242 by suitable pivot means generally indicated at 282. The forwardmost end section of a rod clevis 288 is utilized to make this connection. The connection between piston 260 and cable gripping device 242 is such that forward and rearward movement of the piston relative to previously recited axis 248 causes the cable gripping device to move between its position out of engagement with the cable as shown in FIG. 2 and its cable gripping position shown in FIG. 1.

Overall cable following apparatus 200 as described thus far is similar structurally and functionally to the embodiment illustrated in FIGS. 6–9 in the Reichman II patent application recited above. As discussed in this latter application, the apparatus moves in incremental steps along the cable from one end of the latter to its other end. For purposes of discussion, let it be assumed that the cable gripping devices 240 and 242 are initially in the positions shown in FIG. 2 and that the port 264 is opened to ambient pressure while hydraulic fluid is being applied into the cylinder through port 262. Under these conditions, the piston 260 is moved forward and the cylinder is biased in the rearward direction. The rearward biasing of cylinder 258 causes cable gripping device 240 to lie tightly in gripping engagement with cable 227 locking tube 226 in place. At the same time, forward movement of piston 260 causes the cable gripping device 242 to remain out of engagement with the cable. In addition, as the piston moves forward it pulls cable gripping device 242 and cable guiding tube 230 forward with it. This movement continues until the forwardmost end of tube 230 engages the rearwardmost end of tube 226. At the same time, the piston is designed to be fully drawn within the cylinder. Once this occurs, the port 262 opens to ambient pressure and the port 264 receives hydraulic fluid. This causes the piston to move rearwardly a slight distance, specifically enough to pivot its cable gripping device 242 into locking engagment with the cable. At the same time, the cylinder is moved forward relative to the locked in piston which, in turn, causes the cable gripping device 240 to pivot out of engagement with the cable. Thus, the entire cylinder is able to continue in a forward direction, thereby forming tube 202 and 226 forward in incremental steps relative to the locked in tube 230. This ultimately places the piston in an extended position relative to the cylinder and results in a correspondingly large space between the back end of tube 226 and the front end of tube 230.

The procedure just recited is continuously repeated. In other words, the piston is moved forward into the cylinder from its extended to its retracted position while cable gripping device 240 is in its cable gripping position and the cable gripping device 242 is out of engagment with the cable, thus, causing the tube 230 to move in incremental step forward relative to the cable. Thereafter, the cylinder 258 is caused to move forward while the cable gripping device 242 is in its cable gripping position and the cable gripping device 240 is out of engagement with the cable, thus causing the tubes 202 and 226 to move forward an incremental step. From this pattern, it should be apparent that no cable gripping device engages the cable 227 during movement of its associated guide tube. However, at the same time, it should be equally apparent that one of the cable gripping devices is always in engagement with the cable as the overall apparatus moves incrementally in the forward direction. So long as that is the case, it is not possible to cause the apparatus to move rearwardly, for example by means of a tow rope or the like. As will be seen below, overall apparatus 200 includes a relatively simple technique for causing cable gripping devices 240 and 242 to remain out of engagement with the cable 227, at the same time, so that the entire apparatus can be pulled rearwardly along the cable in the event that this becomes desirable or necessary. To this extent, overall apparatus 200 differs from and is an improvement over the cable follower described in FIGS. 6–9 in the Reichman II application.

In order to release both cable gripping devices 240 and 242 from cable 227, overall apparatus 200 includes a rope 300 fixedly connected to the back end of tube 230 by a suitable flange connector generally indicated at 302. In addition, clevis 288 includes a rearwardly extending segment 304 adapted to engage spacer 206 in the manner described hereinafter. These are the only additional components forming part of apparatus 200 (over and above those in the FIGS. 6–9 embodiment of the Reichman II application) necessary to cause the cable gripping devices 240 and 242 to simultaneously release cable 227, as will be seen below.

In order to release cable gripping devices 240 and 242 from cable 227, it is necessary for the individual doing so to pull with moderate tension on rope 300 as the cable follower moves in its normal manner in the forward direction. The operator begins initiating release of both cable gripping devices as the piston-cylinder unit completes its retracting stroke during which time front gripping device 240 is in its cable gripping position and device 242 is in a disengaged position. After this cycle has ended and at the beginning of the next cycle (as the piston-cylinder unit expands), the operator begins to pull tube 230 in a rearward direction (by means of rope 300) at a faster rate than the piston-cylinder unit expands. As a result, the rear gripper will not engage the cable during this cycle. At the same time, the tension on tube 230 by means of rope 300 acts through cylinder 258 for preventing gripping device 240 from disengaging from cable 227. However, when piston 260 reaches the end of its extension stroke (entirely outwardly from the cylinder), the rearwardmost end 304 of rod clevis 288 engages spacer 206 as illustrated in FIG. 3. This causes the cylinder to move forward relative to the piston which, in turn, forces the front gripping device 240 to disengage from cable 227. At that time, both cable gripping devices are in their cable released positions as shown in FIG. 3 and the entire apparatus can be pulled rearwardly along cable 227 by means of rope 300.

What is claimed is:

1. An apparatus for moving along the length of an existing cable in a forward direction, comprising: a main body including first and second segments interconnected for limited slidable movement relative to one another; means for supporting said main body to said cable such that alternating slidable movement of said body segments in said forward direction causes said main body to slide forward along said cable, said supporting means including first cable gripping means connected with said first body segment and movable between a first position in engagement with said cable for preventing said first segment from sliding along said cable and a second position out of engagement with said cable and second cable gripping means connected with said second body segment and movable between a first position in engagement with said cable for preventing said second segment form sliding along said cable and a second position out of engagement with said cable; means for causing said first and second body segments to slide alternately in the forward direction, said slide causing means including means for maintaining said first gripping means in its cable engaging first position during sliding movement of said second segment and in its second position out of engagement with said cable during sliding movement of said first segment and, at the same time, for maintaining said second gripping means in its cable engaging first position during sliding movement of said first segment and its second position out of engagement with said cable during said sliding movement of said second segment; and cable freeing means for placing both said first and second cable gripping means in their respective second positions out of engagement with said cable, at the same time, whereby said main body can be pulled rearwardly along said cable at a faster rate, said last mentioned means including rope means connected with said second body segment for pulling said main body in a rearward direction along said cable when said first and second cable gripping means are in their second positions at the same time, said slide causing means including a piston-cylinder mechanism including an outer cylinder and a piston disposed within said cylinder for movement between an extended position and a retracted position relative to said cylinder whereby to cause the overall mechanism to expand and contract in length, means for causing said piston-cylinder mechanism to expand and contract in length in a controlled alternating fashion, and first and second meanns for respectively connecting said cylinder to said first cable gripping means and said piston to said second cable gripping means such that during the expansion of said piston-cylinder mechanism, said first body segment is caused to slide forward relative to said cable while said second cable gripping means is maintained in its cable gripping position so as to prevent said second body segment from moving relative to said cable and such that contraction of said piston-cylinder mechanism causes said second body segment to slide forward relative to said cable while said first gripping means is maintained in the cable gripping position so as to prevent said first body segment form moving relative to said cable, said cable freeing means including means for preventing said second cable gripping means from engaging said cable during the expansion of said piston-cylinder mechanism while at the same time maintaining said first cable gripping means disengaged from said cable.

2. An apparatus according to claim 1 wherein said preventing means includes rope means connected with said second body segment for pulling the latter rearwardly after the expansion of said piston-cylinder mechanism at a speed at least equal to the rearward movement of said piston, whereby the entire main body is simultaneously pulled rearwardly along the cable.

3. An apparatus according to claim 2 wherein said preventing means includes a rod clevis carried by said piston and engagable against said first body segment before said piston-cylinder mechanism is entirely expanded as said second body segment is pulled rearwardly in order to cause said first cable gripping means to become disengaged from said cable.

4. An apparatus for moving along the length of an existing cable in a forward direction, comprising: a main body including first and second segments interconnected for limited slidable movement relative to one another; means for supporting said main body to said cable such that alternating slidable movement of said body segments in said forward direction causes said main body to slide forward along said cable, said supporting means including first cable gripping means connected with said first body segment and movable between a first position in engagement with said cable for preventing said first segment from sliding along said cable and a second position out of engagement with said cable and second cable gripping means connected with said second body segment and movable between a first position in engagement with said cable for preventing said second segment from sliding along said cable and a second position out of engagement with said cable; means for causing said first and second body segments to slide alternately in the forward direction, said slide causing means including means for maintaining said first gripping means in its cable engaging first position during sliding movement of said second segment and in its second position out of engagement with said cable during sliding movement of said first segment and, at the said time, for maintaining said second gripping means in its cable engaging first position during sliding movement of said first segment and its second position out of engagement with said cable during said sliding movement of said second segment; and cable freeing means for placing both said first and second cable gripping means in their respective second positions out of engagement with said cable, at the same time, whereby said main body can be pulled rearwardly along said cable at a faster rate, said last mentioned means including rope means connected with said second body segment for pulling said main body in a rearward direction along said cable when said first and second cable gripping means are in their second positions at the same time, said slide causing means including a piston-cylinder mechanism including an outer cylinder and a piston disposed within said cylinder for movement between an extended position and a retracted position relative to said cylinder whereby to cause the overall mechanism to expand and contract in length, means for causing said piston-cylinder mechanism to expand and contract in length in a controlled alternating fashion, and first and second means for respectively connecting said cylinder to said first cable gripping means and said piston to said second cable gripping means such that during the expansion of said piston-cylinder mechanism, said first body segment is caused to slide forward relative to said cable while said second cable gripping means is maintained in its cable gripping position so as to prevent said second body segment from moving relative to said cable and such that contraction of said piston-cylinder mechanism causes said second body segment to slide forward relative to said cable while said first gripping means is maintained in the cable gripping position so as to prevent said first body segment from moving relative to said cable, said cable freeing means including means for preventing said second cable gripping means from engaging said cable during the expansion of said piston-cylinder mechanism while at the same time maintaining said first cable gripping means disengaged from said cable, said preventing means including rope means connected with said second body segment for pulling the latter rearwardly after the expansion of said piston-cylinder mechanism at a speed at least equal to the rearward movement of said piston, whereby the entire main body is simultaneously pulled rearwardly along the cable, said preventing means also including a rod clevis carried by said piston and engagable against said first body segment before said piston-cylinder mechanism is entirely expanded as said second body segment is pulled rearwardly in order to cause said first cable gripping means to become disengaged from said cable, said first cable gripping means being pivotally connected at one point to said first body segment and at a second point to said cylinder, wherein said second cable gripping means is connected at one point to said second body segment and at a second point to said piston such that the initial expansion of said piston-cylinder mechanism from its contracted position simultaneously causes said first cable gripping means to pivotally move from its cable gripping position to a position out of engagement with said cable and said second cable gripping means to pivotally move from its position out of engagement with said cable to its cable gripping position and such that contraction of said piston-cylinder mechanism from its expanded position simultaneously causes said first gripping means to pivotally move from its position out of engagement with said cable to its cable engaging position and said second cable gripping means to pivotally move from its cable gripping position to a position out of engagement with said cable, and wherein said pulling of said second body segment rearwardly prevents said second gripping means from pivoting to its cable gripping position during expansion of said piston-cylinder mechanism.

5. An apparatus for moving along the length of an existing cable in a forward direction, comprising: a main body including first and second segments interconnected for limited slidable movement relative to one another; means for supporting said main body to said cable such that alternating slidable movement of said body segments in said forward direction causes said main body to slide forward along said cable, said supporting means including first cable gripping means connected with said first body segment and movable between a first position in engagement with said cable for preventing said first segment from sliding along said cable and a second position out of engagement with said cable and second cable gripping means connected with said second body segment and movable between a first position in engagement with said cable for preventing said second segment from sliding along said cable and a second position out of engagement with said cable; drive means movable in a predetermined way for causing said first and second body segments to slide alternately in the forward direction, said drive means including means for maintaining said first gripping means in its cable engaging first position during sliding movement of said second segments and in its second position out of engagement with said cable during sliding movement of said first segment and, at the same time, for maintaining said second gripping means in its cable engaging first position during sliding movement of said first segment and its second position out of engagement with said cable during said sliding movement of said second segment; and rope means connected with said main body and cooperating with said drive means such that pulling said main body rearwardly by said rope means at a particular point in the predetermined movement of said drive means causes both said gripping means to be maintained in positions out of engagement with said cable whereby continued rearward pulling of said main body by said rope means causes said main body to be pulled rearward.

6. An apparatus according to claim 5 wherein said drive means includes: a piston-cylinder mechanism including an outer cylinder and a piston disposed within said cylinder for movement between an extended position and a retracted position relative to said cylinder whereby to cause the overall mechanism to expand and contract in length; means for causing said piston-cylinder mechanism to expand and contract in length in a controlled alternating fashion; and first and second means for respectively connecting said cylinder to said first cable gripping means and said piston to said second cable gripping means such that during the expansion of said piston-cylinder mechanism, said first body segment is caused to slide forward relative to said cable while said second cable gripping means is maintained in its cable gripping position so as to prevent said second body segment from moving relative to said cable and such that contraction of said piston-cylinder mechanism causes said second body segment to slide forward relative to said cable while said first gripping means is maintained in the cable gripping position so as to prevent said first body segment from moving relative to said cable.

7. An apparatus for moving along the length of an existing cable in a forward direction, comprising: main body means including first and second segments interconnected for limited slidable movement relative to one another; first and second cable gripping means respectively connected with said first and second segments of said main body means, each of said gripping means being movable between one position for gripping said cable and a second non-gripping position; an arrangement including means movable in a predetermined way for causing said first and second gripping means to alternately grip said cable and for causing said first and second segments of said main body means to slide relative to one another such that said main body means is caused to move in a forward direction along said cable; and rope means connected with said main body means and cooperating with said arrangement such that pulling said main body rearwardly by said rope means at a particular point in the predetermined movement of said movable means causes both of said gripping means to be held in a non-gripping positions simultaneously whereby continued rearward pulling of said main body means by said rope means causes said main body means to move rearwardly with said rope means.

8. An apparatus according to claim 7 wherein said arrangement includes a piston-cylinder mechanism serving as said movable means, said piston-cylinder mechanism moving in said predetermined way by expanding and contracting, said mechanism being connected with said first and second gripping means in a way which causes the latter to alternately grip said cable and, at the same time, causes said first and second segments of said main body means to slide relative to one another when said piston-cylinder mechanism expands and contracts in said predetermined way.

* * * * *